(12) United States Patent
Chen et al.

(10) Patent No.: US 8,756,307 B1
(45) Date of Patent: Jun. 17, 2014

(54) TRANSLATING SERVICE LEVEL OBJECTIVES TO SYSTEM METRICS

(75) Inventors: Yuan Chen, Sunnyvale, CA (US); Dejan S. Milojicic, Palo Alto, CA (US); Subramoniam N. Iyer, Newark, CA (US); Akhil Sahai, Santa Clara, CA (US); Xue Liu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/830,586

(22) Filed: Jul. 30, 2007

(51) Int. Cl.
*G06F 15/173* (2006.01)
*G06F 11/34* (2006.01)

(52) U.S. Cl.
CPC ............................... *G06F 11/3414* (2013.01)
USPC ............ 709/224; 709/223; 709/225; 709/226

(58) Field of Classification Search
CPC .................................................. G06F 11/3414
USPC .................................................. 709/223–226
See application file for complete search history.

(56) References Cited

U.S. PATENT DOCUMENTS

| | | | |
|---|---|---|---|
| 6,643,613 B2 * | 11/2003 | McGee et al. | 702/186 |
| 6,914,967 B1 * | 7/2005 | Baca et al. | 379/112.08 |
| 7,076,695 B2 * | 7/2006 | McGee et al. | 714/47.2 |
| 2002/0120741 A1 * | 8/2002 | Webb et al. | 709/225 |
| 2002/0129048 A1 * | 9/2002 | Qiu et al. | 707/204 |
| 2002/0152305 A1 * | 10/2002 | Jackson et al. | 709/224 |
| 2003/0061362 A1 * | 3/2003 | Qiu et al. | 709/229 |
| 2008/0312978 A1 * | 12/2008 | Binney et al. | 705/7 |
| 2011/0172963 A1 * | 7/2011 | Gu et al. | 702/182 |
| 2013/0174149 A1 * | 7/2013 | Dasgupta et al. | 718/1 |

OTHER PUBLICATIONS

Barham, P. et al., "Xen and the Art of Virtualization", SOSP'03, Oct. 2003, Bolton Landing, NY, ACM 2003.
Cecchet, E. et al., "A Comparision of Software Architectures for E-Business Applications", downloaded Jul. 10, 2007.
Chandra, A. et al., "Dynamic Resource Allocation for Shared Data Centers Using Online Measurements", downloaded Jul. 10, 2007.
Cohen, I. et al., "Capturing, Indexing, Clustering, and Retrieving System History", SOSP'05, Oct. 2005, Brighton, UK, ACM 2005.
Doyle, R.P., "Model-Based Resource Provisioning in a Web Service Utility", downloaded Jul. 10, 2007.
Graupner, S. et al., "Resource-Sharing and Service Deployment in Virtual Data Centers", Proc. 22nd ICDCS, p. 666-674, Jul. 2002, Abstract.
Kelly, T., "Detecting Performance Anomalies in Global Applications", Dec. 2005.
Levy, R. et al., "Performance Management for Cluster Based Web Services", downloaded Jul. 10, 2007.
Liu, X. et al., "Modeling 3-Tiered Web Applications", downloaded Jul. 10, 2007.
Reiser, M. et al., "Mean-Value Analysis of Closed Multichain Queuing Networks", ACM vol. 27, No. 2, Apr. 1980, p. 313-322.

(Continued)

*Primary Examiner* — Mohamed Wasel (57) ABSTRACT

Service level objectives for a multi-tier system are translated to low-level system metrics by determining component profiles. The component profiles include performance parameters calculated as a function of applied resources for each of a plurality of components of the multi-tier system. Performance models including service level parameters are also determined. The performance models are determined as a function of the performance parameters and workload characteristics. The service level objectives are translated to the low-level system metrics using the performance models.

18 Claims, 8 Drawing Sheets

(56) References Cited

OTHER PUBLICATIONS

Rubis, http://rubis.objectweb.org/, downloaded Jul. 10, 2007.
Slothouber, L.P., "A Model of Web Server Performance", Jun. 1995.
Stewart, C. et al., "Performance Modeling and System Management for Multi-Component Online Services", USENIX NSDI 2005.
TPC Council, http://www.tpc.org/tpcw/, downloaded Jul. 10, 2007.
Udupi, Y. et al., "A Classification-Based Approach to Policy Refinement", HP Laboratories Palo Alto, HPL-2007-6, Jan. 11, 2007.
Urgaonkar, B. et al., "Dynamic Provisioning of Multi-tier Internet Applications", downloaded Jul. 10, 2007.
Urgaonkar, B. et al., "An Analytical Model for Multi-tier Internet Services and Its Applications", downloaded Jul. 10, 2007.
Urgaonkar, B. et al., "Cataclysm: Handling Extreme Overloads in Internet Services", downloaded Jul. 10, 2007.
Zhang, A. et al., "Optimal Server Resource Allocation Using an Open Queueing Network Model of Response Time", HP Laboratories Palo Alto, HPL-2002-301, Oct. 21, 2002.

\* cited by examiner

TRANSLATING SERVICE LEVEL OBJECTIVES TO SYSTEM METRICS

BACKGROUND

A Service Level Agreement (SLA) captures the formal agreement between a service provider and one of its customers relating to service behavior guarantees, escalation procedures, and penalties in case the guarantees are violated. When SLA requirements are agreed upon, a service administrator usually designs the service and then stages it. In many cases, the staging process is iterative in nature and involves several manual interventions. Once the service is observed to behave satisfactorily during staging, it is put in production.

Enterprise applications are typically comprised of a large number of components, which interact with one another in a complex manner. Since each component potentially affects the overall behavior of the system, any high level service level objectives (SLOs) which may be related to performance, availability, security, etc., specified for the service potentially relates to many or all the components. One of the key tasks during the design stage of an enterprise system is determining the amount or capacity of computer resources to be provisioned for the enterprise system such that the SLOs specified in the SLA are satisfied.

System administrators and experts normally apply their domain knowledge to determine the amount of resources to provision for an enterprise system to satisfy high-level goals, such as the SLOs. However, in many instances, resources are over-provisioned resulting in under-utilized resources. Also, the task of determining the amount of resources is iterative, time-consuming and complex.

SUMMARY

Service level objectives for a multi-tier system are translated to low-level system metrics by determining component profiles. The component profiles include performance parameters calculated as a function of applied resources for each of a plurality of components of the multi-tier system. Performance models including service level parameters are also determined. The performance models are determined as a function of the performance parameters and workload characteristics. The service level objectives are translated to the low-level system metrics using the performance models.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, SLOs are translated to lower-level system metrics that can be used to provision resources for systems, which may include complex multi-tier systems or other types of less complex systems.

Figure 1:
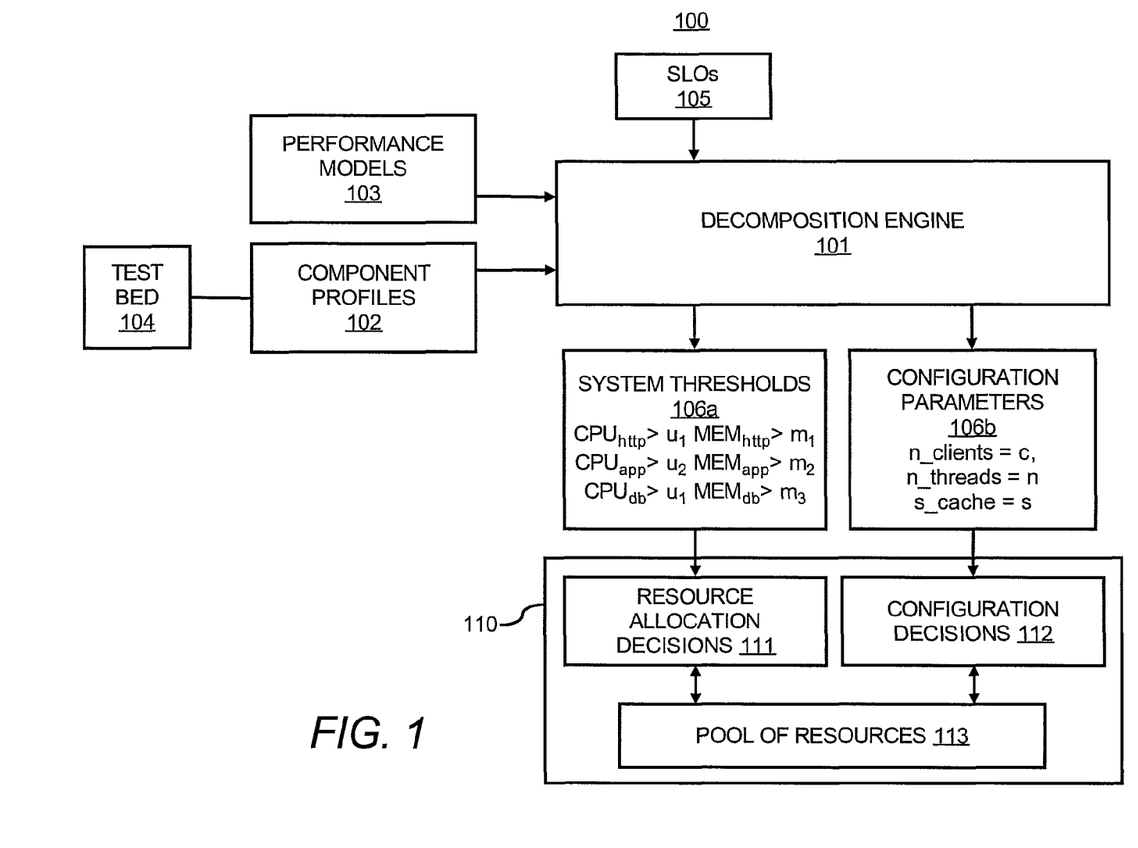
FIG. 1 illustrates a system for translating service level objectives to low-level system metrics, according to an embodiment.

FIG. 1 illustrates a decomposition system 100, according to an embodiment, which is operable to be used to translate high-level system goals, such as SLOs, to system metrics that specify resource quantities, system thresholds, configuration parameters and other information for provisioning resources for a multi-tier system or other types of system.

Figure 2:
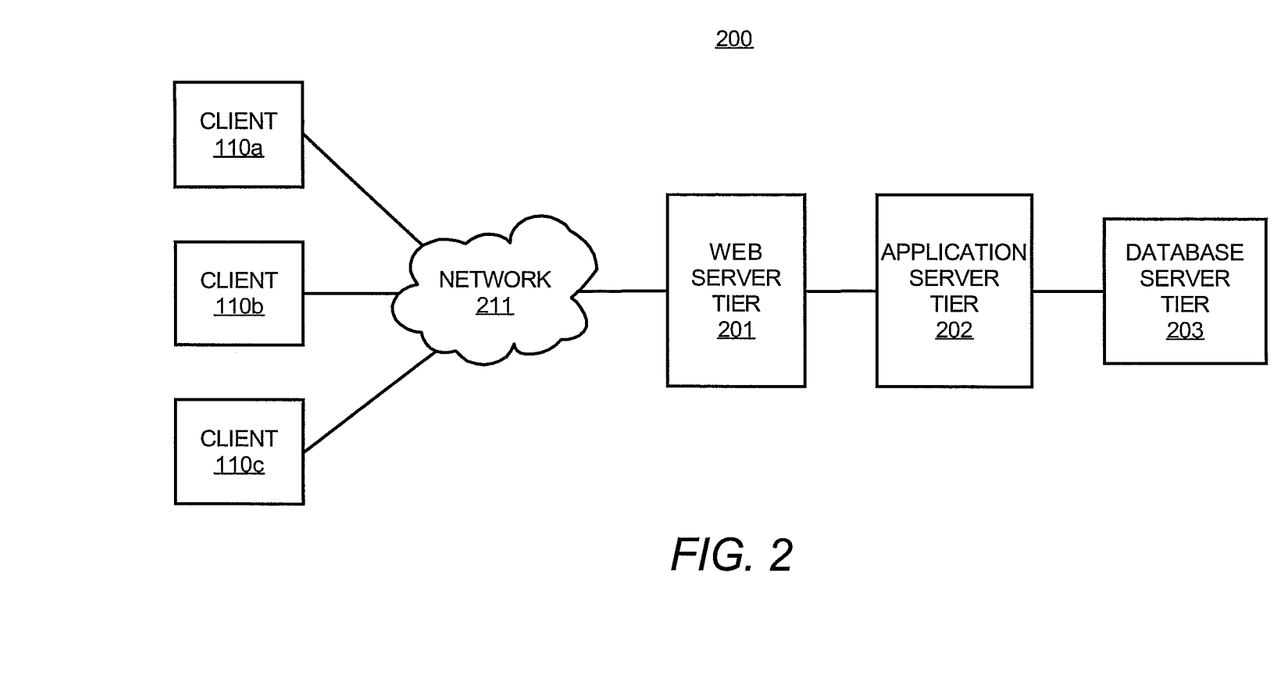
FIG. 2 illustrates a block diagram of 3-tier system, according to an embodiment.

An example of a multi-tier system 200 is shown in FIG. 2, which is used to describe the decomposition system 100 of FIG. 1. A description of the multi-tier system 200 is described first, which is followed by a description the decomposition system 100, referring to the multi-tier system shown in FIG. 2 as an example.

The multi-tier system 200 shown in FIG. 2 includes three logical tiers. A first tier includes a web server tier 201, a second tier includes an application server tier 202 and a third tier includes a database server tier 203.

A tier is also referred to as a component of a system. A component is logical partition of an entire system. Components may be divided based on functionality, such as with the web server tier 201, the application server tier 202 and the database server 203. A component may be comprised of computer resources and software, including the applications executed on the computer resources. Examples of computer resources include servers, CPUs, memory, disks, network connections, etc.

In many instances, each component provides certain functionality additive to its preceding component and uses the functionality provided by its successor to carry out its part of the overall processing. Consider a multi-tier application consisting of M tiers, T1, ..., TM. A request may be processed once by each tier and forwarded to its succeeding tier for further processing. Once the result is processed by the final tier TM, the results are sent back by each tier in the reverse order until it reaches tier T1. Then, tier T1 sends the results to the client. For example, in the multi-tier system 200 shown in FIG. 2, one or more of clients 110a-c sends a request to the multi-tier system 200 via network 211. Each client request is processed initially by the web server tier 201, and then the results are forwarded to the application server tier 202 for further processing. Then, the request is processed in the application server tier 202, and the results are forwarded to the database server tier 203 for further processing, such as to retrieve data corresponding to the client request. Once the database tier 203 retrieves the data, the database server tier 203 sends the results to the application server tier 202, and the results are transmitted to the client via the web server tier 201. In more complex processing scenarios, each request at tier Ti, can trigger zero or multiple requests to tier Ti+1. For example, a static web page request is processed by the web server tier 201 entirely and will not be forward to the following tiers. On the other hand, a keyword search at a web site may trigger multiple queries to the database server tier 203.

The multi-tier system 200 may be executed in a data center, and a system administrator may be responsible for provisioning computer resources for each component of the multi-tier system 200 such that predetermined SLOs are satisfied. Because tier performance may be dependent on a previous or subsequent tier's performance and because high-level goals specified in SLOs do not easily map to computer resources needed for each component to satisfy SLOs, it is difficult for a system administrator to provision resources for the components. The decomposition system 100 translates SLOs to lower-level system metrics specifying resources to be provisioned for each component to satisfy SLOs.

The decomposition system 100, shown in FIG. 1, includes a decomposition engine 101, component profiles 102, and performance models 103. The component profiles 102, for example, are generated by running simulations of the components on a testbed 104 and measuring metrics, referred to as performance parameters, for each component. Each component, i.e., tier, performs as well or poorly as the resources allocated to the component. A component profile captures the component's performance characteristics as a function of the quantity of computer resources that are allocated to the component. This quantity of resources is referred to as a quantity of applied resources. The quantity of applied resources may be specified in terms of capacity for each type of resource. For example, number of megabytes (Mbs) of memory, number of memory modules given a predetermined capacity for each module, CPU processing capacity in terms of operations per second, or a number of CPUs if they are homogenous or a normalized number if they are heterogeneous, etc. Other resources may also be considered.

To generate a component profile, a component under test, such as the web server tier 201, application server tier 202, or database server tier 203 shown in FIG. 2, is initially allocated a predetermined quantity of resources, including CPUs and memory in the testbed 104 shown in FIG. 1. Then, a variety of workloads, such as requests for services delivered at various rates, are synthetically generated and applied to the component under test, and the resulting performance parameters of the component under test are measured and collected. For example, performance parameters may include measured response time, such as the rate at which requests are processed or the time to process a single request. A performance parameter may be a value calculated from a statistical function of response times. For example, the performance parameter for a component may be the mean service rate $\mu$ or variance of service time $\sigma$ for the component with the predetermined quantity of resources applied. Then, the component under test is allocated a different quantity of resources, e.g., another CPU is added or more memory is added, and the test is repeated to determine the mean service rate $\mu$ and variance of service time $\sigma$ for the component. After repeating the test over a range of quantities of resources, a performance profile is generated for the component comprised of determined performance parameters for each quantity of applied resources. This process is repeated so that the performance characteristics of each component of the system may be measured independent of other components.

In this way, it is possible to determine a performance parameter as a function of quantity of applied resources for each of a plurality of components in the multi-tier system. For example, the components are the web server tier 201, the application server tier 202 and the database server tier 203 shown in FIG. 1. The test bed 104 may simulate requests generated by the clients 210a-c, the web server tier 201 and the database server tier 203. The application server tier 202 is the component under test. The performance parameter may be the response time measured from receipt of a request from the web server tier 201 to delivery of the processed results to the next tier, which is the database server tier 203. Another example of the performance parameter may be the response time of the reverse flow measured from receipt of return data from the database server tier 203 to delivery of returned data to the web server tier 201. Other performance parameters that may be profiled include the number of requests per second that can be processed per unit time, a parameter called the throughput.

Profiles may include the performance parameter $\mu$, which is the mean service rate at which requests are processed or the time to process a single request by a component. Examples of $\mu$ for each component are as follows:

$$\mu_{http}=f_1(CPU_{http}, MEM_{http}, n\_clients); \mu_{app}=f_2(CPU_{app}, MEM_{app}, n\_threads);$$

$$\mu_{db}=f_3(CPU_{db}, MEM_{db}, s\_cache).$$

http, app and db are the web server tier 201, application server tier 202, or database server tier 203, respectively. $\mu$ is a function of quantity of applied resources for each component. n-clients may be the number of clients. n_threads may be the number of threads. s-cache may be the cache(s) capacity.

The performance parameter measurements for the component profiles 102 may be obtained either through operating system instrumentation or by estimation based on monitored information in the application itself or in middleware. T. Kelley in "Detecting Performance Anomalies in Global Applications," In Proc. of Second USENIX Workshop on Real, Large Distributed Systems (WORLDS 2005), 2005, describes a type of profiling performed through operating system instrumentation. Approaches using operating system instrumentation can achieve transparency to the application and component middleware but may involve changes to the system kernel. On the other hand, B. Urgaonkar, G. Pacific, P. Shenoy, M. Spreitzer, and A. Tantawi, "An Analytical Model for Multi-tier Internet Services and its Applications," In Proc. of ACM SIGMETRICS, June 2005, describes profiling performed through estimation based on the application's own, or middleware's, monitoring information (e.g., service time recorded in Apache and Tomcat log file). This approach is less intrusive.

After acquiring the measurements, statistical analysis may be performed to determine performance profiles. Y. Udupi, A. Sahai and S. Singhal, "A Classification-Based Approach to Policy Refinement," In Proc. of The Tenth IFIP/IEEE IM, May 2007, describes a classification based approach to determining metrics, which may be used to determine the profiles 102. X. Liu, J. Heo, and L. Sha, "Modeling 3-Tiered Web Applications," In Proc. of 13th IEEE MASCOTS, Atlanta, Ga., 2005 describes a regression analysis based approach. For example, an Apache Web server's profile captures the correlation between an Apache Web server's mean service rate and the quantity of CPU and memory allocated to it, i.e. $\mu=f(CPU, MEM)$.

In the profile examples described above, given any combination of CPU and MEM capacities, a performance metric is expressed as an equation such as $\mu=f(CPU, MEM)$. Similar equations are derived, if needed for performance models, described below, or for the variance of service time $\sigma$. Likewise, equations are derived, if needed, for other system models, and equations can be derived for other high level goals such as availability, security, etc.

The system 100 includes the performance models 103, which may be determined from the performance parameters in the component profiles 102 and workload characteristics w. A performance model is characterized by at least one service level parameter that captures the relationship between each single component and the overall system performance. The service level parameter may be determined as a function of one or more of the component profiles 102.

Response time R is an example of a service level parameter defined as the time between when a client makes a request to a system (e.g., the multi-tier system 200 shown in FIG. 2) and the system sends back a response to the client's request. Another example of a service level parameter is the total throughput X of the system expressed as the number of client requests the system can process in a second. Such service level parameters are often specified in a SLA as SLOs. The modeling of each service level parameter defines the service level parameter as a function of the performance parameters that correspond to each of the several components. R and X may be calculated as follows: $R=g_1(\mu 1_{http}, \mu 1_{app}, \mu 1_{db}, w1)$ and $X=g_2(\mu 2_{http}, \mu 2_{app}, \mu 2_{db}, w2)$. These equations specify that R and X are functions ($g_1$ and $g_2$, respectively) of the component profiles 102 and the workload characteristics w. For example, the response time is based on the mean service rate for each component of the system. The equations take into account that the mean service rates, and the response time is dependent on how the components interact and the type of workload (e.g., workload characteristics), which may cause the components to interact differently depending on the type of workload (e.g., a service request that only requires one component to process the request and respond to the request versus a service request that requires multiple components to process the request). The model of the total system response time $R=g1(\mu 1_{http}, \mu 1_{app}, \mu 1_{db}, w1)$ is indirectly a function of the quantity of applied resources and the workload characteristics. Examples of workload characteristics include visit rate, such as number of visits to a web site in a predetermined period of time, number of clients, and think time, such as the user's response time to make another request after receiving results.

In another example, the service level response time R might be defined in terms of the sum of five time periods. Referring to FIG. 1, the first time period is the web server tier 201 response time measured from receipt of a request from a client to delivery of the processed results to the application server tier 202. The second time period is the application response time measured from receipt of a request from the web server tier 202 to delivery of the processed results to the database server tier 203. The third time period is the database response time measured from receipt of a request from the application server tier 202 to delivery of the response from the database server tier 203 back to the application server tier 204. The fourth time period is the reverse application response time of the reverse flow measured from receipt of return data from the database server tier 202 to delivery of returned data to the web server tier 201. The fifth time period is the reverse web server response time of the reverse flow measured from receipt of return data from the applications server to delivery of returned data to the client who requested service.

The system 100 also includes the decomposition engine 101. The decomposition engine 101 has inputs including the performance models 103, the component profiles 102 and SLOs 105. The SLOs 105 are high-level goals for the system being configured. The decomposition engine 101 translates the SLOs 105 to low-level system metrics 106 using the performance models 103 and the component profiles 102.

The low-level system metrics 106 may include the quantity of the applied resources needed for the system to satisfy the SLOs, which may be specified in terms of ranges or single quantity. For example, low level metrics 106*a*, shown as system thresholds, include ranges for quantities of applied resources needed to satisfy the SLOs 105. Examples shown include $CPU_{http} > u_1$, $MEM_{http} > m_1$, $CPU_{app} > u_2$, $MEM_{app} > m_2$, $CPU_{db} > u_3$, $MEM_{db} > m_3$, where $u_1$-$u_3$ and $m_1$-$m_3$ are quantities for the corresponding resource. The low-level metrics 106*a* are used for allocating resources to the system to satisfy the SLOs 105. For example, the ranges identify the quantity of resources assigned from a data center to a multi-tier system.

Low level metrics 106*b*, shown as configuration parameters, may include single quantities of applied resources. Examples shown include n_clients=c, n_threads=n, and s_cache=s, where c, n and s are specific quantities. The configuration parameters 106*b* are used to configure the multi-tier system.

According to an embodiment, the system thresholds 106*a* and the configuration parameters 106*b* may be used to allocate resources in a resource-on-demand system 110 for a multi-tier system. For example, the system thresholds 106*a* and the configuration parameters 106*b* are used to make resource allocation decisions 111 and configuration decisions 112 to select resources from a pool of resources 113. The pool of resources 113 may include servers that are allocated to applications to run the applications.

In one embodiment, the pool of resources 113 may include lower-level components, such as processors, memory, disk space, network interconnects, etc. For example, virtualized environments, where resources from the pool of resources 113 are pooled into a common shared infrastructure using virtualization technologies, are created to run applications in the multi-tier system. Virtualization technology enables fine granular allocation of resource allocation, but also introduce more dynamism and complexity to SLA management. The decomposition engine 101 determines the resource requirements (e.g., CPU capacity, memory capacity, etc.) and configurations (e.g., CPU assignment) for virtual machines hosting the applications to ensure the agreed-upon SLOs are met. Resource allocation decisions performed by the resource-on-demand system 110 may include determining the capacity and configuration of resources to be allocated for virtual machines running the applications. Resource allocation decisions may be automated in the resource-on-demand system 110 using the low-level metrics 106*a* and 106*b* determined by the decomposition engine 101. It will be apparent to one of ordinary skill in the art that many well known components for provisioning and scheduling resources and making the resource allocation and configuration decisions 111 and 112 in the resource-on-demand system 110 are not shown but may be used in the system 110.

Once the multi-tier system is configured and operational, the system may be monitored to determine whether the SLOs 105 are being satisfied. Monitoring may be performed on a component-by-component basis. Allocated resources may be adjusted to accommodate the SLOs and resource allocation objectives.

According to an embodiment, the decomposition engine 101 determines the low-level metrics 106 by applying the component profiles 102 to the performance models 103 and applying the SLOs 105 to the performance models 103. The decomposition engine 101 determines a solution to the performance models 103 that satisfies the SLOs 105.

For example, an SLO constrains the system design so that the measured system response time R should be less than a value r to satisfy the SLO, i.e., R<r. Expressed in an equation, $R=g_1(\mu 1_{app}, \mu 1_{db}, w)<r$ where $\mu 1_{http}, \mu 1_{app}, \mu 1_{db}$ are functions of the level of resources. As described with respect to the component profiles, $\mu_{http}=f_1(CPU_{http}, MEM_{http}, n\_clients)$, $\mu_{app}=f_2(CPU_{app}, MEM_{app}, n\_threads)$ and $\mu_{db}=f_3(CPU_{db}, MEM_{db}, s\_cache)$. Thus, the equations for expressing R include: $R=g_1((f_1(CPU_{http}, MEM_{http}, n\_clients)), (f_2(CPU_{app}, MEM_{app}, n\_threads)), (f_3(CPU_{db}, MEM_{db}, s\_cache)), w1)<r$. R is solved such that R<r.

Another SLO constrains the system design so that the system throughput X should be greater than a value x, i.e., X>x, to satisfy the SLO. Expressed in an equation, $X=g_2(\mu 2_{http}, \mu 2_{app}, \mu 2_{db}, w2)>x$ where $\mu 2_{http}, \mu 2_{app}, \mu 2_{db}$ are functions of the applied resources. The equations for expressing X include: $X=g_2((f_1(CPU_{http}, MEM_{http}, n\_clients)), (f_2(CPU_{app}, MEM_{app}, n\_threads)), (f_3(CPU_{db}, MEM_{db}, s\_cache)), w2))<x$. X is solved such that X>x. Other constraint equations dealing with security or availability might also be added.

Decomposition is a process of calculating a quantity of the applied resources that are sufficient to ensure that each service level parameter satisfies a corresponding service level objective. Once the equations are identified, the decomposition problem becomes a constraint satisfaction problem to determined the quantity of resources that satisfy the constraints. For example, the equations described above are solved so R<r and X>x. This includes trying different quantities of applied resources from the component profiles 102 until a solution is reached that satisfies the SLOs. For example, a minimum number of CPUs and amount of memory are tried. If the SLO is not satisfied, the quantities are incrementally increased until the SLOs are satisfied. An objective solution may be considered when finding a solution that satisfies the SLOs. For example, an objective function may be to maximize utilization of resources.

Various known constraint satisfaction functions, linear programming and optimization techniques are available to solve such problems, including determining solutions for R<r and X>x. For example, known constraint satisfaction functions, linear programming and optimization techniques may be used to solve the problem of given an M-tier system with SLOs of R<r and X>x and N users, find the quantity of applied resources (e.g., number of CPUs, amount of memory, etc.,) satisfying R<r and X>x. Generally, the solution to the constraint equations is not deterministic and the solution space is large. However, for the present problem of decomposing service level parameters into low level system metrics, the search space is relatively small. For example, consider assigning CPUs to virtual machines at a granularity of 5%. The entire solution space can be efficiently enumerated to find the solutions. Furthermore, since feasible solutions are desired, the search can be stopped once a feasible solution is found rather than continuing the search to identify an optimal solution. Other heuristic techniques can also be used during the search. For example, the hint that the service time of the component typically decreases with respect to the increase of resource allocated to it can reduce the search space.

The described system structure is highly adaptable. If the service level objectives or the application structures change, only the input parameters of the analytical model needs to be changed to generate new low level operational goals. Similarly, if the application is deployed to a new environment, only a profile for new component(s) in that new environment needs to be regenerated.

Given service level objectives defined in a service level agreement and the resource availability in the data center, the decomposition approach discussed above can be applied dynamically. In some embodiments the decomposition is applied dynamically for the automatic recalculation of the level of resources needed to satisfy the service level objective and for the automatic generation of sizing specifications dynamically during system operation. This enables the system to respond to changes of workload demands that may vary over a 24 hour day, over a week or weekend, or over a monthly cycle. Furthermore, service level agreements may provide for differing service level objectives over a 24 hour day, over a week or weekend, or over a monthly cycle. The dynamic reallocation permits these types of objectives to be efficiently achieved. Alternatively, different users may subscribe at different subscription rates for different SLOs (e.g., premium or economy services) that may also vary over time. The generated thresholds are used for creating an efficient design and by monitoring systems for proactive assessment of service level objectives.

According to an embodiment, a queuing network model is used for modeling the performance of a multi-tier system. This includes using a queuing network model to determine the performance models 103 shown in FIG. 1. In one embodiment, the queuing network model is a closed multi-station queuing network, whereby each queue in the multi-station queuing network represents a tier and an underlying server (i.e., the computer resources allocated to the tier). Some of the servers may include a multi-threaded architecture commonly structured in modern servers (e.g., Apache, Tomcat, JBoss, and MySQL).

Once the multi-tier system has been recast as a closed queuing network where each queue is a multi-station queuing center representative of a multi-threaded machine, known analytical models are used to determine the queuing network's performance. For example, M. Reiser and S. S. Lavenberg, "Mean-Value Analysis of Closed Multichain Queuing Networks," J. ACM, vol. 27, pp. 313-322, 1980, describes a mean-value analysis (MVA) technique used for evaluating the performance of a queuing network. Such a model can address user-sessions based workloads found in most e-business applications and accurately predict the multi-tier application's performance based on a single tier's performance and the workload characteristics, such as the flow of the requests across tiers.

In some embodiments, the system is recast into a queuing model capable of addressing arbitrary service rate distributions as well as multiple visits to a tier. Explicitly capturing concurrent limits in the model (e.g., max number of concurrent threads), inherently handles concurrent limits at tiers.

Figure 3:
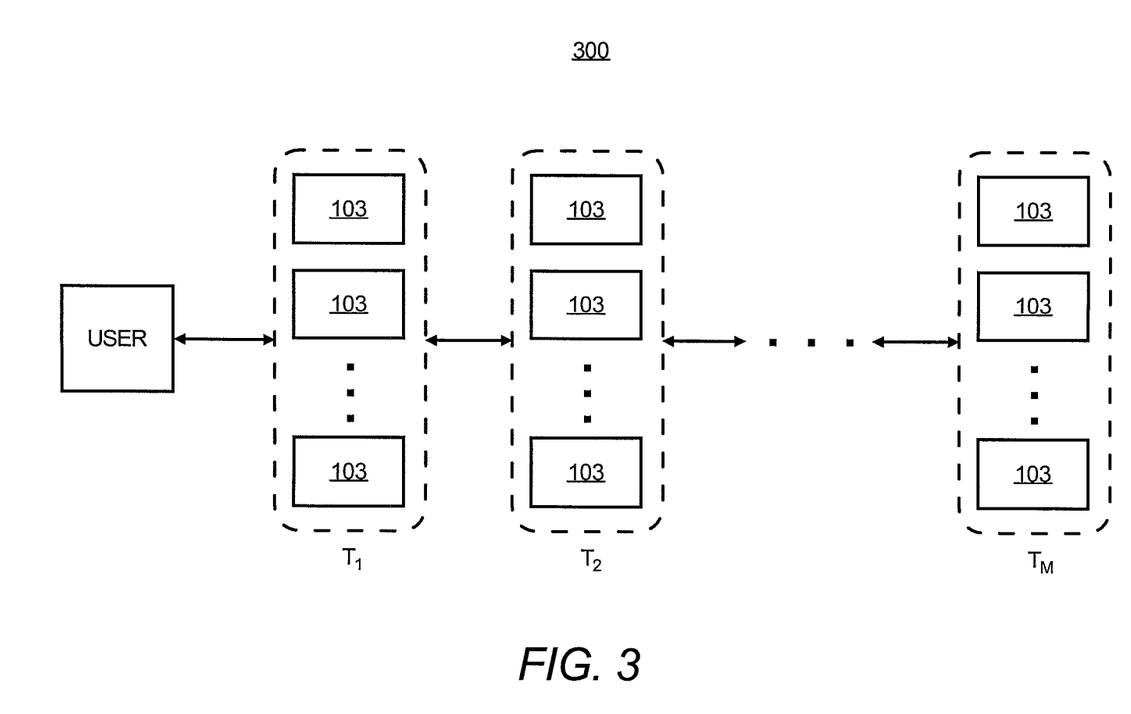
FIG. 3 illustrates a block diagram of an M-tier system, according to an embodiment.
Figure 4:
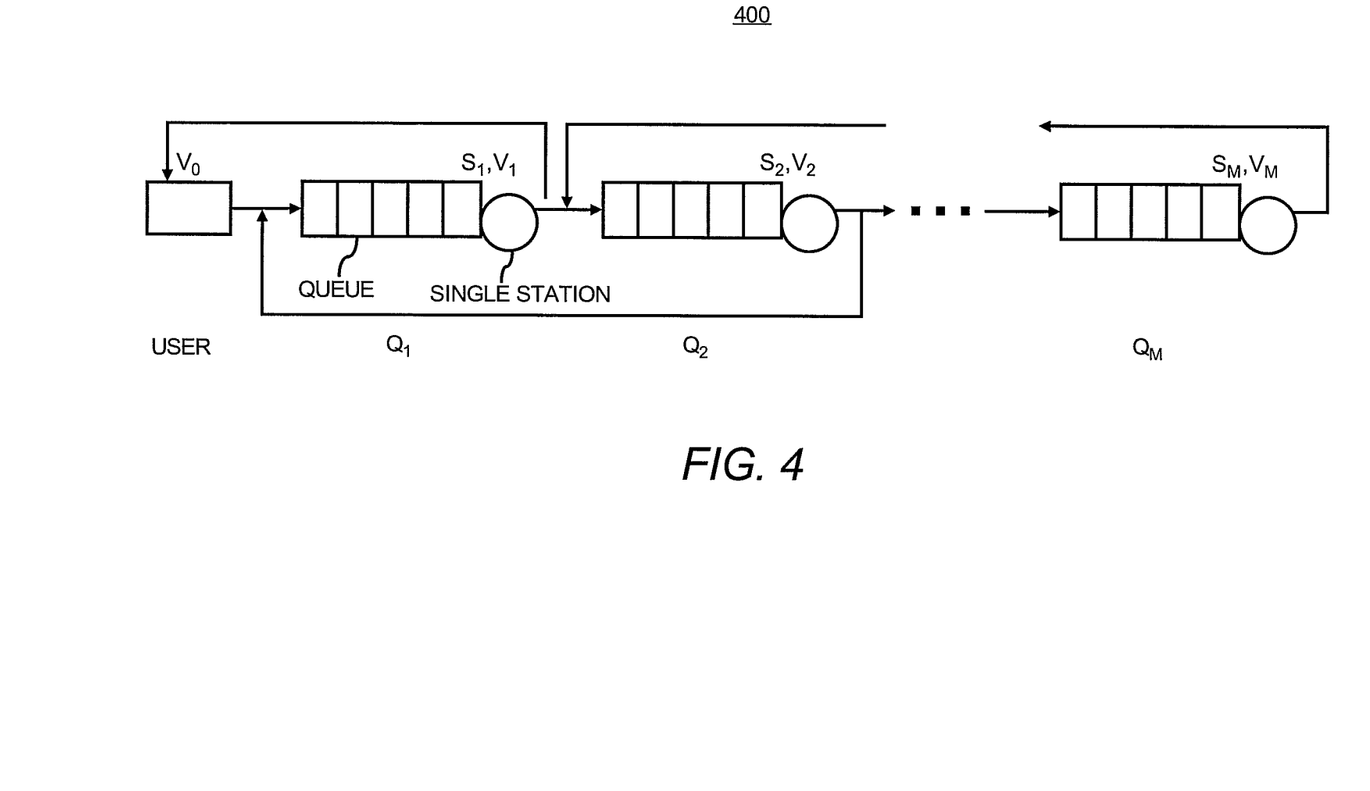
FIG. 4 illustrates a block diagram of a closed queuing network, according to an embodiment.

FIG. 3 illustrates a multi-tier architecture 300 comprising tiers $T_1$-$T_M$. Each tier or component is modeled using the performance models 103. FIG. 4 illustrates a model 400. The model 400 may be used as a model for the M-tier system shown in FIG. 3 or the system shown in FIG. 2. An M-tier system is modeled using a network of M queues $Q_1, Q_2, \ldots, Q_M$ where each queue represents an individual tier. Each queue models the request queue on the underlying server. A request, after being processed at queue $Q_i$ either proceeds to $Q_{i+1}$ or returns to $Q_{i-1}$. A transition from the present queue $Q_i$ back to the previous queue $Q_{i-1}$ denotes a request complementation (i.e., a response back to the client). $V_i$ denotes the average request rate serviced by $Q_i$. Given a mean service time $S_i$ of queue $Q_i$, the average service demand per user request $D_i$ at $Q_i$ can be approximated as $S_i \times (V_i/V_0)$, where $V_0$ is average request rate issued by the users.

The model 400 may be adapted to address multiple visits to a tier. Modern servers typically utilize a multi-thread and/or multi-process architecture. The server listens in the main thread for requests. For each request, the server allocates a thread to handle it. For example, the flow of servicing a static HTTP request is as follows. A request enters the TCP accept queue where it waits for a worker thread. A worker thread processes a single request to completion before accepting another new request. In the most general case, each of the tiers may involve multiple servers and/or multiple threads. The application server tier for example may involve one or more multi-threaded application servers (e.g., Tomcat) running on multiple processors. A similar notion is applicable to the database tier which may consist of one or more database servers (e.g., MySQL) which in turn may run on a multi-threaded/multi-processor system. The amount of concurrency may also be determined by the number of processes or concurrent threads/servers the tier supports.

In order to capture the multi-thread/server architecture and the concurrency, the basic queuing model 400 is enhanced by using a multi-station queuing center to model each tier. In this enhanced model, each worker thread/server in the tier is represented by a station. This enhanced model is referred to as the multi-station queuing model, which is a general representation of a modern server architecture. A multi-station queuing model 500 is shown in FIG. 5.

The workload on a multi-tier application is typically based on a user session that include a succession of requests issued by a user with a "think time" Z in between requests. At any given time, multiple concurrent user sessions are interacting with the application as shown in FIG. 5. In order to capture the user session workload and the concurrency of multiple sessions, a closed queuing network is used where concurrent sessions are modeled as N users in the queuing system as shown in FIG. 5.

Figure 5:
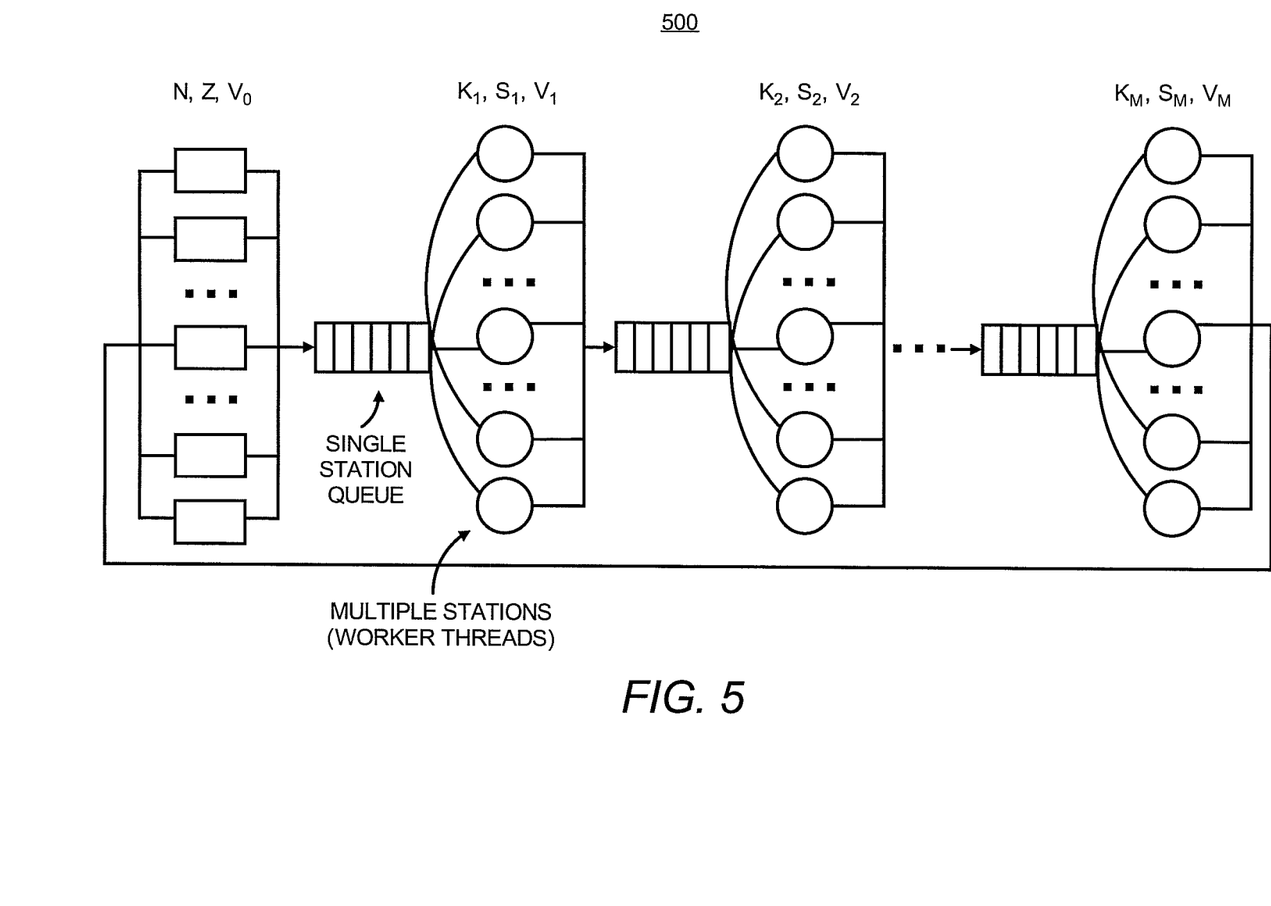
FIG. 5 illustrates a block diagram of a multiple station queuing network, according to an embodiment.

Each tier is modeled by a multi-station queuing center as discussed earlier, with the number of stations being the server's total number of worker threads shown in FIG. 5. $K_i$ denotes the number of worker threads at tier i. Similarly, the mean service time at tier i is denoted by $S_i$. $V_i$ denotes the average request rate serviced by $Q_i$. A user typically waits until the previous request's response returns to send the following request. The average time elapsed between the response from a previous request and the submission of a new request by the same user is called the "think time", denoted by Z.

The multi-station queuing network model 500 can be solved analytically to predict the performance of the underlying system given knowledge of the parameters ($N, Z, V_i, M_i, S_i$). For example, an efficient function such as the Mean-Value Analysis (MVA) function can be used to evaluate the closed queuing network models with exact solutions. See M. Reiser and S. S. Lavenberg, "Mean-Value Analysis of Closed Multichain Queuing Networks," J. ACM, vol. 27, pp. 313-322, 1980. The MVA function is iterative.

The MVA function begins from the initial conditions when the system population is 1 and derives the performance when the population is i from the performance with system population of (i−1). $R_k(i)$ includes both the queuing time and the service time and is defined to be the mean response time (mean residence time) at server k when system population is i. $Q_k(i)$ is defined to be the average number of customers at server k when system population is i. X(i) is defined to be the total system throughput when the system population is i. $D_i$ is defined to be the average service demand per user request at $Q_i$, and can be approximated as Si×(Vi/V0) where $V_0$ is average request rate issued by the users.

However, known MVA functions have a limitation that the known functions can only be applied to single-station queues. Some tiers may be modeled as a multi-station queuing center representative of a multi-threaded server. To overcome the single-station queue limitation of known MVA functions, an approximation is used to get the approximate solution of performance variables using a method similar to a method proposed by Seidmann et al. in "Computerized Closed Network Models of Flexible Manufacturing Systems," Large Scale Systems, vol. 12, pp. 91-107, 1987.

Figure 6:
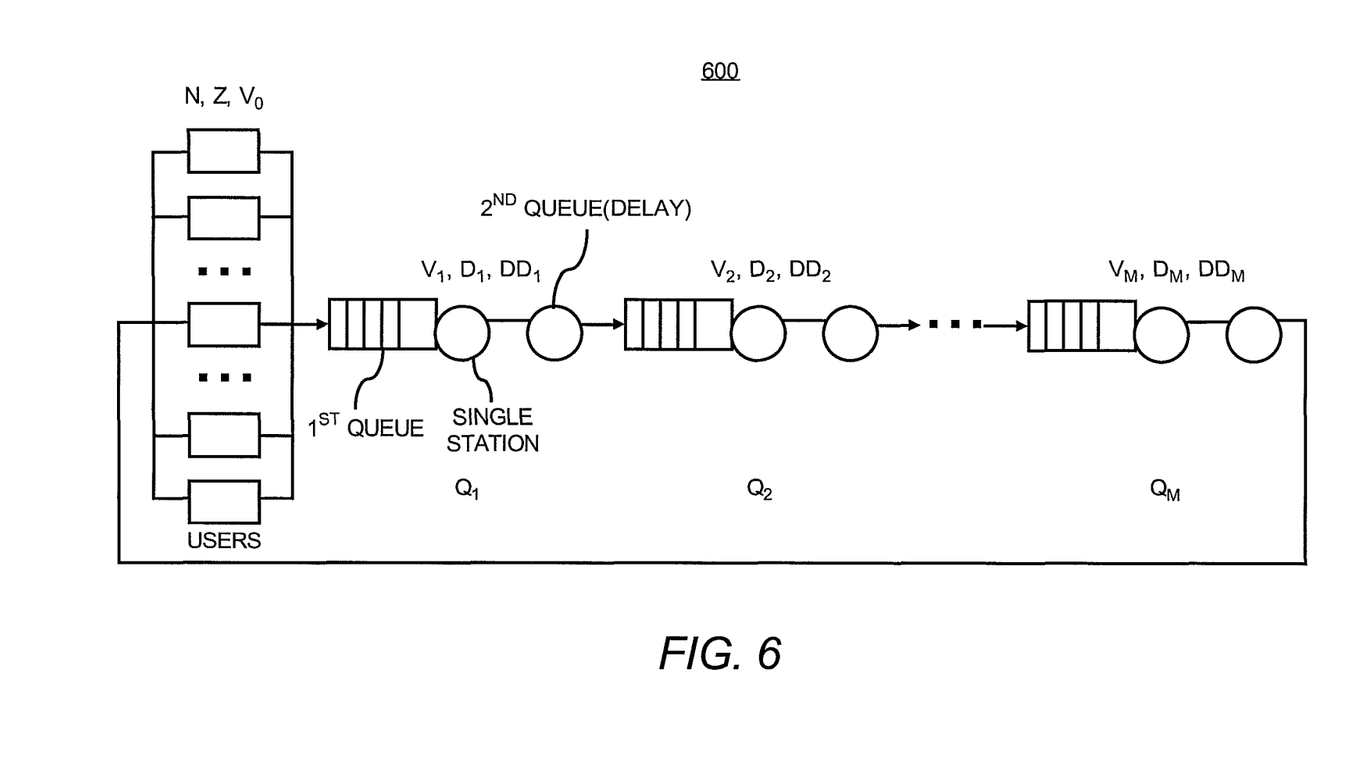
FIG. 6 illustrates a block diagram of an approximation to the network depicted in FIG. 5, according to an embodiment.

FIG. 6 shows the multi-station queuing center model 600 using this approximation. A queuing center that has m stations and service demand $D_i$ at the tier is replaced with two tandem queues. The first queue is a single-station queue with service demand $D_i$/m, and the second queue is a pure delay center with delay $D_i$×(m−1)/m. Any error introduced by this approximation is small. By using this approximation, $qrD_i$ and $drD_i$ are average demands of the regular queuing resource and the delay resource in the tandem queue respectively.

Figure 7:
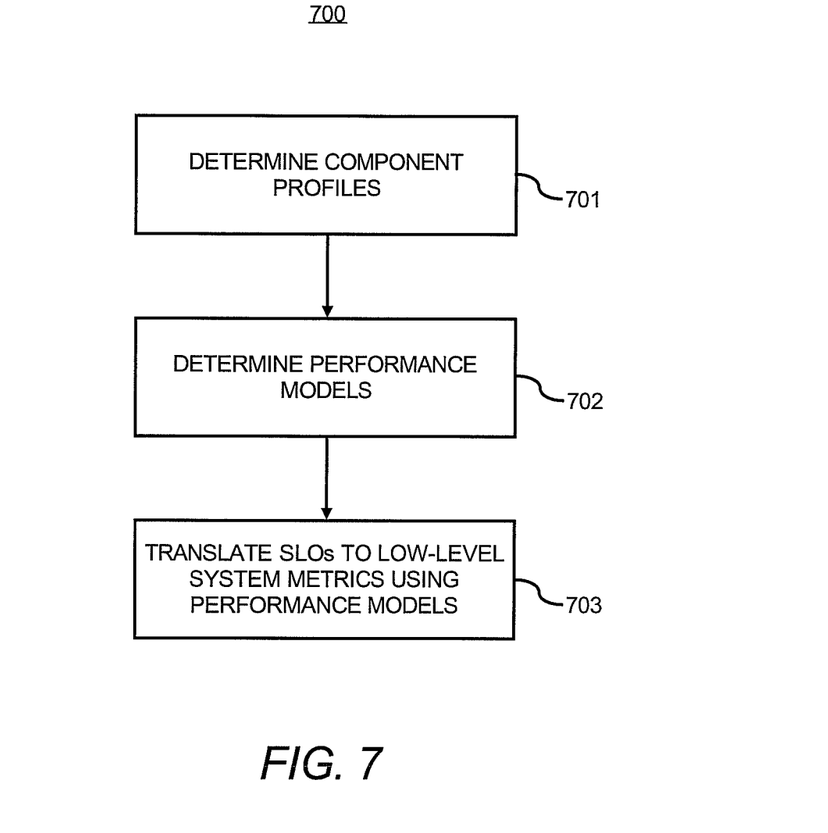
FIG. 7 illustrates a flow chart of a method for translating service level objectives to low-level system metrics, according to an embodiment.

FIG. 7 illustrates a flow chart of a method 700 for translating SLOs to low-level system metrics, according to an embodiment. The method 700 is described with respect to the system shown in FIG. 1 by way of example and not limitation.

At step 701, component profiles are determined. The component profiles, such as the component profiles 102, include performance parameters determined as a function of applied resources for each of a plurality of components of a multi-tier system.

At step 702, performance models are determined. Service level parameters are modeled to create the performance models 103. Each service level parameter is determined as a function of at least one of the performance parameters and workload characteristics.

At step 703, SLOs for a multi-tier system are translated to low-level system metrics using the performance models.

Figure 8:
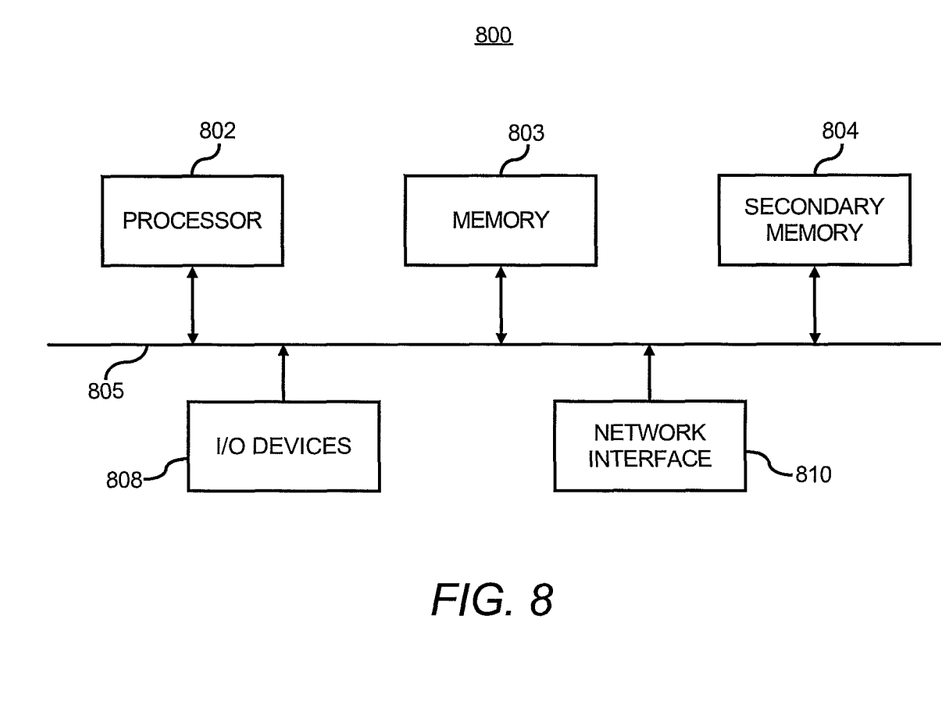
FIG. 8 illustrates a block diagram of a computer system, according to an embodiment.

FIG. 8 illustrates an exemplary block diagram of a computer system 800. The computer system 800 may be used as a platform for running one or more of the elements shown in FIG. 1. The computer system 800 includes one or more processors, such as processor 802, providing an execution platform for executing software, which may include the decomposition engine 101 shown in FIG. 1.

Commands and data from the processor 802 are communicated over a communication bus 805. The computer system 800 also includes a main memory 803, such as a Random Access Memory (RAM), where software may be resident during runtime, and a secondary memory 804. The secondary memory 804 includes, for example, a hard disk drive and/or a removable storage drive, representing a floppy diskette drive, a magnetic tape drive, a compact disk drive, etc., or a nonvolatile memory where a copy of the software may be stored. The secondary memory 804 may also include ROM (read only memory), EPROM (erasable, programmable ROM), EEPROM (electrically erasable, programmable ROM). In addition to storing software, the memory/data storage 803 and 804 may be used to store system models, system configurations, metrics, or other information for translating SLOs to low level metrics.

A user interfaces with the computer system 800 with one or more I/O devices 808, such as a keyboard, a mouse, a stylus, display, and the like. A network interface 810 is provided for communicating with other computer systems via a network.

One or more of the steps of the method 700 and other steps described herein may be implemented as software embedded on a computer readable medium, such as the memory 603 and/or data storage 604, and executed on the computer system 600, for example, by the processor 602. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A method comprising:
    determining performance parameters as a function of applied resources for each of a plurality of components of a multi-tier system;
    modeling the plurality of components as a closed queuing network, wherein at least one of the plurality of components is modeled as a multiple station queuing center representative of a multi-threaded server architecture;
    modeling service level parameters, wherein the modeling of each service level parameter is determined as a function of at least one of the performance parameters and workload characteristics; and
    translating service level objectives for the multi-tier system to low-level system metrics using the models of the service level parameters.

2. The method of claim 1, wherein translating service level objectives to low-level system metrics using the models of the service level parameters comprises:
    calculating a quantity of applied resources for each component of the multi-tier system using the models of the service level parameters, wherein the calculated quantity of applied resources are sufficient to ensure that each service level objective is satisfied.

3. The method of claim 2, wherein calculating a quantity of applied resources for each component of the multi-tier system using the models of the service level parameters comprises:
    incrementally varying a quantity of applied resources to determine each of the performance parameters for each incremental variation;
    applying the performance parameters for each incremental variation to the models of the service level parameters until the service level objectives are satisfied.

4. The method of claim 3, wherein applying the performance parameters for each incremental variation to the models of the service level parameters until the service level objectives are satisfied comprises:
    applying the performance parameters for each incremental variation to the models of the service level parameters until the service level objectives are satisfied and an objective function for allocating resources to the multi-tier system is met.

5. The method of claim 1, wherein the service level objectives are values for the service level parameters.

6. The method of claim 1, wherein translating service level objectives for the multi-tier system to low-level system metrics using the models of the service level parameters comprises:
    determining configuration parameters for the multi-tier system such that the service level objectives are satisfied.

7. The method of claim 1, wherein the service level parameters includes system response time and a throughput.

8. The method of claim 1, wherein modeling the plurality of components comprises:
    modeling a first component of the plurality of components as a multiple station queuing center by approximating the multiple station queuing center with first and second queues processed in tandem to one another.

9. The method of claim 8, wherein approximating the multiple station queuing center comprises:
    modeling the first queue as a single-station queue that has a modeled service demand equal to a prorated share of a total service demand processed by the multiple station queuing center.

10. The method of claim 9, wherein the modeled service demand equals D/m where D is the total service demand processed by the multiple station queuing center and m is a number of stations in the multiple station queuing center.

11. The method of claim 8, wherein approximating the multiple station queuing center comprises:
    modeling the second queue as a single-station queue that has a modeled delay proportional to a total service demand at the queuing center.

12. The method of claim 8, wherein the modeled delay equals $D \times (m-1)/m$ where D is the total service demand processed by the multiple station queuing center and m is a number of stations in the multiple station queuing center.

13. The method of claim 1, further comprising:
    determining an allocation of resources based on the low-level system metrics, wherein the allocation of resources includes allocating resources from a pool of resources in a resource-on-demand system for virtual machines running applications of the components in the multi-tier system.

14. A system including a computer storage medium operable to translate service level objectives to low-level system metrics, the system comprising:
    a plurality of component profiles, each component profile corresponding to a component of a plurality of components in a multi-tier system, and each component profile includes a performance parameter calculated as a function of applied resources to a component of the multi-tier system, wherein the plurality of components are modeled as a closed queuing network and at least one of the plurality of components is modeled as a multiple station queuing center representative of a multi-threaded server architecture;
    a plurality of performance models, wherein each performance model is determined as a function of at least one of the performance parameters and workload characteristics; and
    a controller configured to translate service level objectives for the multi-tier system to low-level system metrics using the performance models.

15. The system of claim 14, wherein the controller is configured to calculate a quantity of applied resources for each component of the multi-tier system using the performance models, wherein the calculated quantity of applied resources are sufficient to ensure that each service level objective is satisfied.

16. The system of claim 15, wherein the controller is configured to calculate a quantity of applied resources for each component of the multi-tier system based on an objective function for allocating resources to the multi-tier system.

17. A computer system comprising:

data storage storing a plurality of component profiles, each component profile corresponding to a component of a plurality of components in a multi-tier system, and each component profile includes a performance parameter calculated as a function of applied resources to a component of the multi-tier system wherein the plurality of components are modeled as a closed queuing network and at least one of the plurality of components is modeled as a multiple station queuing center representative of a multi-threaded server architecture, and wherein the data storage stores a plurality of performance models, wherein each performance model is determined as a function of at least one of the performance parameters and workload characteristics; and a computer readable medium including instructions that when executed by a processor translate service level objectives for the multi-tier system to low-level system metrics using the performance models.

18. The computer system of claim 17, wherein the instructions when executed calculate a quantity of applied resources for each component of the multi-tier system using the performance models, wherein the calculated quantity of applied resources are sufficient to ensure that each service level objective is satisfied.

* * * * *